June 9, 1964 S. H. AULD, JR., ETAL 3,136,502
AUTOMATIC LANDING APPROACH SYSTEM FOR AIRCRAFT
Filed Dec. 20, 1962 4 Sheets-Sheet 3

INVENTORS.
SAMUEL H. AULD, JR.
KENNETH C. KRAMER
BY HAROLD N. TOBIE

Richard P. Albert
AGENT

June 9, 1964 S. H. AULD, JR., ETAL 3,136,502
AUTOMATIC LANDING APPROACH SYSTEM FOR AIRCRAFT
Filed Dec. 20, 1962 4 Sheets-Sheet 4

INVENTORS.
SAMUEL H. AULD, JR.
KENNETH C. KRAMER
BY HAROLD N. TOBIE

Richard P. Alberi
AGENT

United States Patent Office 3,136,502
Patented June 9, 1964

3,136,502
AUTOMATIC LANDING APPROACH SYSTEM
FOR AIRCRAFT
Samuel H. Auld, Jr., Wichita, Kans., and Kenneth C.
Kramer and Harold N. Tobie, Woodland Hills, Calif.,
assignors to Lear Siegler, Inc.
Filed Dec. 20, 1962, Ser. No. 246,660
27 Claims. (Cl. 244—77)

This invention relates to instrument landing approach systems for aircraft, particularly automatic approaches wherein the aircraft's autopilot receives guidance from the instrument landing system, and more particularly to improvements in the autopilot providing greatly increased lateral accuracy to permit lateral guidance during automatic landings.

This application is a continuation-in-part of application bearing Serial No. 148,631, filed October 30, 1961, by Samuel H. Auld, Jr., Kenneth C. Kramer, and Harold N. Tobie for Automatic Landing Approach System for Aircraft.

At the present time, instrument landing systems (ILS) consist of both ground and airborne equipment. A transmitter is positioned normally at the far end of the runway which transmits electrical signals along a beam, the beam being the desired approach to the runway. Aircraft have means to detect this signal and determine the angular distance of the aircraft from the center of the signal. This is known as the error signal. There are both lateral and longitudinal error signals. The error signals are presently displayed in the cockpit so that the pilot can see how far he is off the beam and maneuver the aircraft back onto the beam. The signal may also be coupled to the autopilot to provide a completely automatic landing approach system.

Automatic approaches are used wherein the signal from the transmitter is used to steer the airplane in the roll axis but the aerodynamic sluggishness and inertia of the aircraft, in response to turning commands, is such that the aircraft is difficult to keep on the center of the beam, as the beam becomes very narrow in the vicinity of the runway. Instability generally occurs with resultant overshooting.

A method of maintaining the aircraft on the beam with regard only to the lateral displacement of the aircraft was disclosed by Mr. Siegfried Knemeyer, working for the Wright Aeronautical Systems Division, Dayton, Ohio. Mr. Knemeyer's method was disclosed by K. C. Kramer at the Fall 1961 Assembly Meeting of the Radio Technical Commission for Aeronautics on October 31, 1961. A copy of Mr. Kramer's talk is available from the Astronomics Division of Lear Siegler, Inc., at 3171 South Bundy Drive, Santa Monica, California. Mr. Knemeyer disclosed a method to maintain the fuselage of an aircraft in line with the runway heading at all times, and to insert steering commands into the roll axis so as to slip the airplane in response to errors in the instrument landing signal. The response of the aircraft to such commands is much more rapid and overcomes the problem of turning inertia, sluggishness, and consequent instabilities. Mr. Knemeyer's system further included a lateral accelerometer, which is normally included in the yaw axis, but which is disconnected, except when the aircraft is slipping to an extent that might damage the aircraft. The lateral accelerometer signal then connects to cancel out a portion of the commands to the yaw axis. In operation, the airplane, according to Mr. Knemeyer's system, picks up the instrument landing signal, and any deviation of the aircraft from the path of the instrument landing signal represents an error signal. The error signal passes through a limit circuit having two outputs. The first output goes to the roll axis controllers to roll the aircraft and thereby cause the aircraft to slip and get back on the desired path. The first output, however, is limited so that the aircraft is not allowed to roll beyond the safe limit. The second output of the limit circuit becomes effective when the error signal has reached the maximum allowed to the roll axis controllers. The second output is transferred to the yaw axis controllers to cause the rudder to turn the airplane. The second output only comes into effect when the plane is too far off the path to slip safely into the path.

The system also requires the normal course select signal which is transferred to the yaw axis controllers and the lateral acceleration signal which again prevents unsafe lateral acceleration by sending a signal to the yaw axis controllers to aid in turning the aircraft toward the desired path when the aircraft is too far off the desired path to be brought in by a safe slip of the aircraft.

It was found that the above described basic system could be improved by the addition of a means to augment the yaw axis controllers to assure the aircraft of staying on the desired path. A further improvement could be obtained by the addition of a means to augment the yaw axis controllers to anticipate the return of the aircraft to the desired path in order to prevent the aircraft from overshooting the desired path. Still another improvement in the above described system could be obtained by the inclusion of a means in the roll axis to anticipate the return of the aircraft to the beam and thereby roll the aircraft out level prior to return to the beam so as to allow the momentum of the aircraft to bring the aircraft on the desired path.

It is, therefore, an object of this invention to provide an improved lateral automatic landing approach system for aircraft.

It is another object of this invention to provide an automatic lateral landing approach system for aircraft which has means for augmenting the yaw axis controllers to assure the aircraft of staying on the desired path.

It is still another object of this invention to provide a lateral automatic landing approach system for aircraft which has means to augment the yaw axis controllers to anticipate the return of the aircraft to the desired path to prevent the aircraft from overshooting the desired path.

It is still another object of this invention to provide a lateral automatic landing approach system for aircraft which includes means in the roll axis to anticipate the return of the aircraft to the beam, and thereby roll the aircraft out level prior to return to the beam so as to allow the momentum of the aircraft to bring the aircraft on the desired path.

A better understanding of the objects and advantages of this invention will be had from the following description when taken in conjunction with the drawings in which:

FIGS. 7 and 9 are wave-form diagrams showing the outputs of limit #2.

Description of the System

Figure 1:
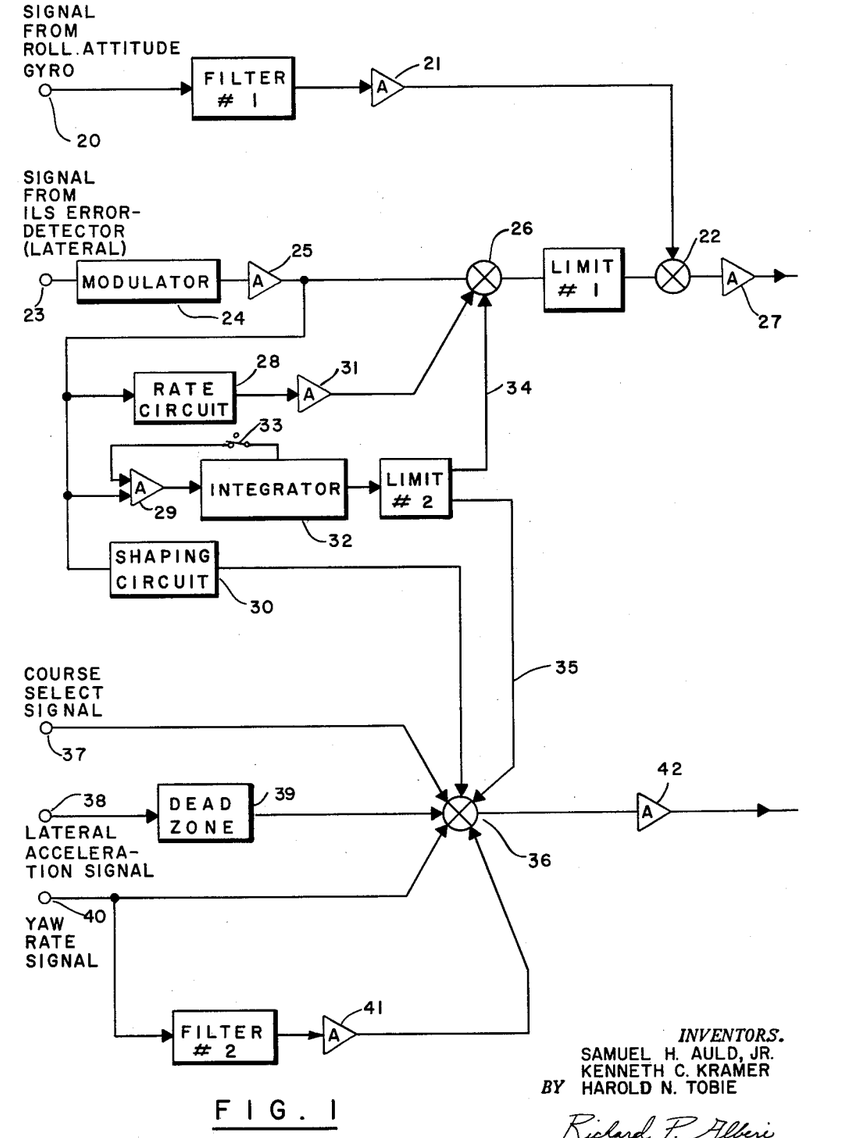
FIG. 1 is a block diagram of the present invention.

Referring to FIG. 1, a signal from the roll attitude gyroscope is put in on terminal 20. Terminal 20 is electrically connected to filter #1. Filter #1 acts as a high and low pass filter and will be described below. Amplifier 21 is electrically connected to the output of filter #1. An adder circuit 22, well known in the art, is electrically connected to the output of amplifier 21. Signals from the instrument landing system error detector are put into the system at terminal 23. Modulator 24 is electrically connected to terminal 23. Amplifier 25 is electrically connected to the output of modulator 24. Adder circuit 26 is electrically connected to the output of amplifier 25. Limit #1 is electrically connected to the adder circuit 26, the output of limit #1 is electrically connected to adder circuit 22. Amplifier 27 is electrically connected to the ouptut of adder circuit 22. The output of amplifier 27 is electrically connected to the roll axis controllers. A rate circuit 28, amplifier 29 and shaping circuit 30 are also electrically connected to the output of amplifier 25. The output of rate circuit 28 is electrically connected to the adder circuit 26 by way of amplifier 31. An integrator 32 is electrically connected to the output of amplifier 29 and has a feed back to amplifier 29 by way of synchro switch 33. Limit #2 is electrically connected to the output of integrator 32. Limit #2 has two outputs, one on line 34, and one on line 35. Line 34 is directly connected to adder circuit 26. Adder circuit 36 is electrically connected to the output of shaping circuit 30 and directly connected to limit #2 by way of line 35. Any deviation of the aircraft from the course selected by the pilot appears on terminal 37 as the course select error signal. Terminal 37 is directly connected to adder 36. A signal representing the lateral acceleration of the aircraft is introduced at terminal 38. Dead zone 39 is directly connected to terminal 38 and the output of dead zone 39 is electrically connected to adder circuit 36. A signal representing the rate of turn of the aircraft (yaw rate signal) is introduced at terminal 40. Terminal 40 is also directly connected to adder circuit 36. Filter #2 is also connected to the terminal 40 and the output of filter #2 is again connected to the adder circuit 36 by way of amplifier 41. The output of the adder circuit 36 is electrically connected to the yaw axis controllers by way of amplifier 42.

*Filter #1*

Figure 2:
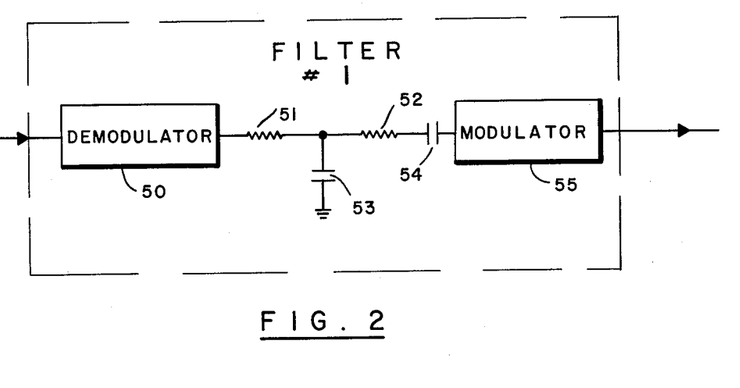
FIG. 2 is a schematic of a typical filter #1.

A typical circuit for filter #1 is shown in FIG. 2. The input to filter #1 is passed to the demodulator 50. One end of resistor 51 is electrically connected to demodulator 50. The other end of resistor 51 is electrically connected to one end of resistor 52 and one side of capacitor 53. The other side of capacitor 53 is electrically connected to ground. The other side of resistor 52 is connected to one side of capacitor 54. The other side of capacitor 54 is connected to the input of modulator 55. The output of modulator 55 is the output of filter #1. In operation, the resistor 51, resistor 52, and capacitor 53 serve as a low pass filter. The capacitor 53 is chosen to have a value such that signals coming from the demodulator 50 and having a frequency below a given magnitude, for example, a 100K cycles per second, would pass to the capacitor 54. Signals above the 100K cycles per second pass through capacitor 53 to ground. The capacitor 54 and resistor 52 function as a high pass filter; for example, will only pass signals above a given frequency, such as, for example, 50K cycles per second. The modulator 55, consequently, has an input in a given frequency range for example, from 50K cycles per second to 100K cycles per second. The input to modulator 55 is modulated in the normal manner and the output of modulator 55 is the output of filter #1. Filter #1, consequently, allows signals within a given frequency range to pass through it.

*Rate Circuit*

Figure 3:
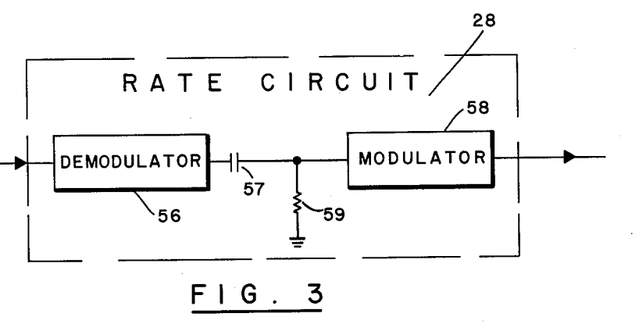
FIG. 3 is a schematic of a typical rate circuit.

A typical rate circuit 28 is shown in FIG. 3. The input is connected to a demodulator 56. The output of demodulator 56 is directly connected to capacitor 57. A modulator 58 is connected to the other side of capacitor 57, one side of resistor 59 is also connected to the other side of capacitor 57. The other side of resistor 59 is connected to ground. The output of modulator 58 is the output of rate circuit 28.

In operation, the demodulator 56 filters out any stray signals imposed upon the incoming signal to the rate circuit 28. The capacitor 57 can have a time constant of approximately five seconds, thereby acting as a differentiator. The modulator 58 merely modulates the signal coming from the capacitor 57, and therefore, the rate circuit 28, in effect, differentiates the incoming signal.

*Limit #1*

Figure 4:
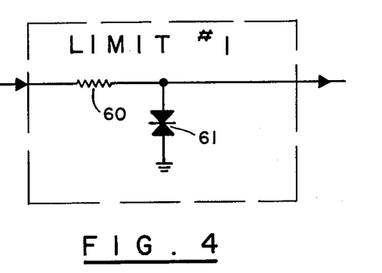
FIG. 4 is a schematic of a typical limit #1.
Figure 5:
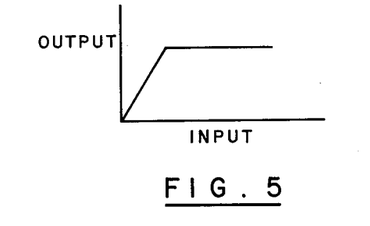
FIG. 5 is a wave-form diagram showing the input and output of limit #1.

A typical limit #1 is shown in FIG. 4. The input is connected to one side of resistor 60. The other side of resistor 60 is connected to the output of limit #1 and also to the double zener diode 61. As shown in FIG. 5, until the input of limit #1 reaches a given magnitude, the output of limit #1 is proportional to the input. The magnitude is determined by the breakdown voltage of the double zener diode 61. When the electrical input reaches a sufficient magnitude to cause the double zener diode 61 to conduct, the output of limit #1 maintains the maximum magnitude, until the input signal to limit #1 drops again.

*Integrator*

Figure 6:
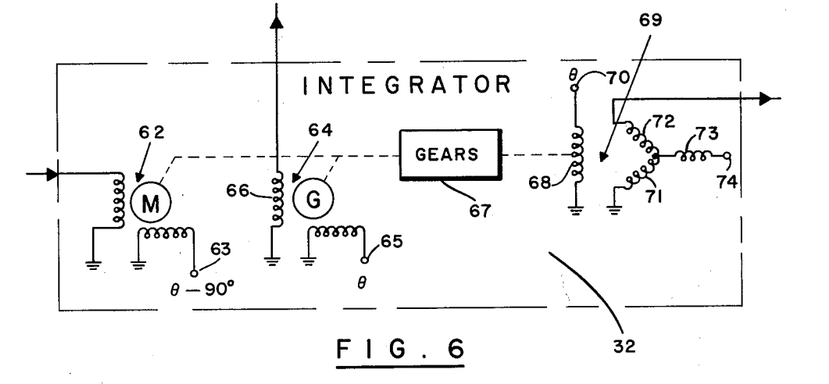
FIG. 6 is a schematic of a typical integrator.

A typical mechanical integrator is shown in FIG. 6. The two-phase motor 62 has a constant feed from terminal 63 and a controlling signal from the input of integrator 32. The motor 62 is mechanically connected to generator 64. The input signal to generator 64 is on terminal 65 and the output of the generator 64 is on the windings 66. Note, that the output of the generator 64 is one of the outputs of the integrator 32 which is fed back to amplifier 29 to cancel the signal entering amplifier 29. The output of motor 62 is also mechanically connected to gears 67. The gears, in effect, integrate the mechanical input to the gears 67 such that the output of the gears 67 is the integral movement of input to gears 67. Rotor winding 68 of synchro 69 is mechanically driven by the output of the gears 67. Winding 68 is energized at terminal 70. The stator windings 71, 72, and 73 of synchro 69 constitute the output of integrator 32. Note, that terminal 74 of synchro 69 is a floating terminal and that the winding 71 is connected to ground.

In operation, the electrical input to integrator 32 drives motor 62 which, in turn, drives generator 64, the output of the generator 64 is fed back to amplifier 29 to cancel the input to the amplifier 29 and thereby constitutes a feedback. The output of motor 62 is also mechanically connected to the gears 67 which integrate the mechanical movement of the output of motor 62, and thereby move winding 68 of synchro 69 as the integral of the electrical signal to the motor 62. The position of the rotor winding 68 determines the output picked up on windings 71, 72 and 73.

The reason for the mechanical integrator is to have a long term time constant which proves memory. In other words, when rotor winding 68 has been positioned, the output of integrator 32 remains the same until a new signal is presented to motor 62, which in turn repositions rotor winding 68 to provide a new output of integrator 32. Such long term time constants are impractical in completely electronic circuits, but it is to be noted that this example shown in FIG. 6 is like the other examples shown in FIGS. 2–12 in that they may be replaced by any suitable units which will accomplish the same result without altering the present invention shown in FIG. 1.

*Limit #2*

Figure 7:
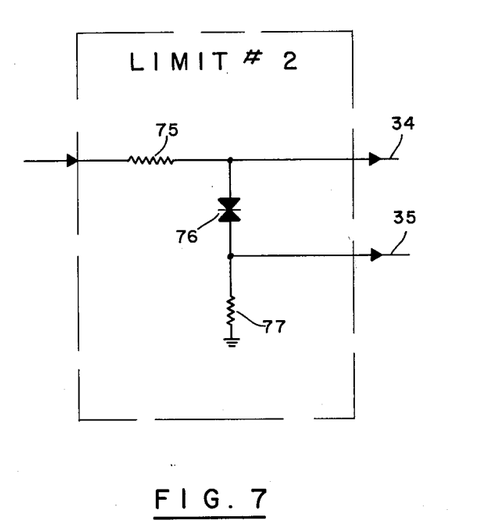
FIG. 7 is a schematic of a typical limit #2.

As shown in FIG. 7, a resistor 75 has one side connected to the input of limit #2. The other side of resistor 75 is connected to one output line 34. The output line 34 is also connected by way of double zener diode 76 and resistor 77 to ground. The second output line 35 is connected between the double zener diode 76 and the resistor 77.

Figure 8:
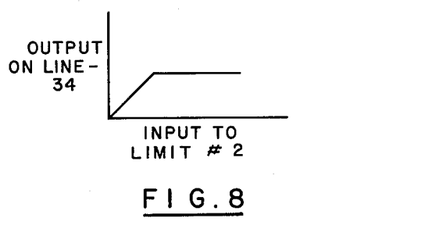
Figure 9:
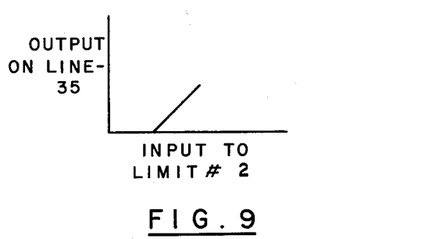

As shown in FIG. 8, the output on line 34 is linear and proportional to input to limit #2, until the limit determined by the breakdown voltage of the double zener diode 76 is reached, at which time the signal over the breakdown voltage passes through the double zener diode and without line 35 it would pass to ground. FIG. 9 shows the output on line 35. In operation, then, a signal is put into limit #2. Any signal below the breakdown voltage of the double zener diode 76 is allowed to pass on line 34. Any signal above the breakdown voltage of double zener diode 76 is allowed to pass on line 35. Limit #2 acts substantially as a divider, limiting the output on line 34, and putting all the excess on to line 35.

Shaping Circuit

Figure 10:
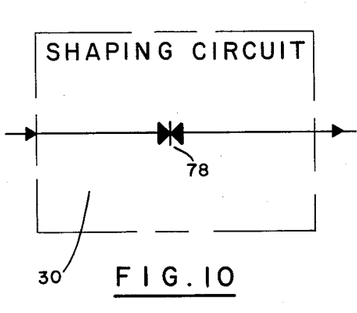
FIG. 10 is a schematic of a typical shaping circuit.

A typical shaping circuit is shown in FIG. 10. The input to the shaping circuit 30 is merely connected to a double zener diode 78 and the output of the shaping circuit 30 is connected to the other side of the double zener diode 78.

Figure 11:
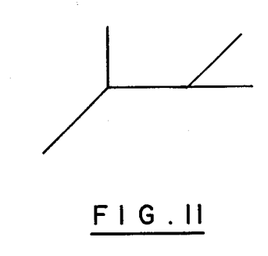
FIG. 11 is a wave-form diagram showing the input and output of the shaping circuit.

With an alternating current signal coming into the shaping circuit, there will be no output until the magnitude of the input signal has reached the desired level as determined by the double zener diode 78, and then the output above the desired level is linear and proportional as shown in FIG. 11. In effect, the shaping circuit in this form is a dead zone circuit wherein no signal is transferred until the signal reaches a given magnitude.

Filter #2

Figure 12:
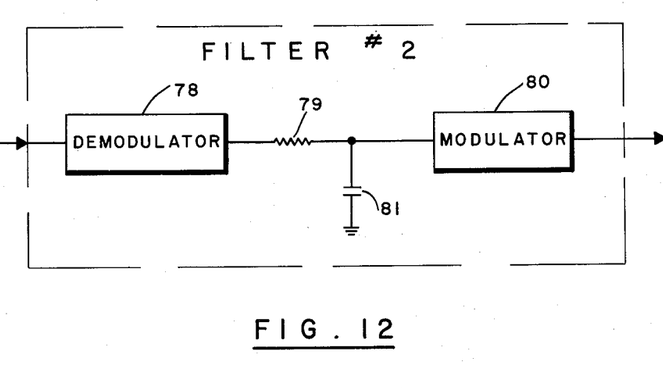
FIG. 12 is a schematic of a typical filter #2.

As shown in FIG. 12, the input to filter #2 is directly connected to a demodulator 78. The output of demodulator 78 is directly connected to one side of resistor 79. The other side of resistor 79 is directly connected to modulator 80 and one side of capacitor 81. The other side of capacitor 81 is connected to ground and the output of modulator 80 is the output of filter #2. In operation, the incoming signal is demodulated in the normal manner and any low frequency signals are allowed to pass to the modulator 80. However, since the effective resistance of the capacitor 81 decreases with the increase in frequency of the signal emitted by demodulator 78, when the frequency has reached a given magnitude the signal is effectively shorted through capacitor 81 to ground. Filter #2 is in effect a low pass filter allowing low frequency signals to pass and high frequency signals to be shorted to ground.

Dead Zone

The dead zone 39 can be substantially the same as shaping circuit 30, i.e., a double zener diode 78 having a given breakdown voltage such that all signals below the breakdown voltage of the double zener diode 78 do not pass through the dead zone 39, whereas signals above the given breakdown voltage do pass through the dead zone.

Operation of the System

In order to understand the operation of this system, first note the signals from the ILS error detector. As stated before, these signals represent the deviation of the aircraft from the desired flight path down to the runway. The desired flight path down to the runway is set up by a signal transmitter on the runway, which transmits signals along the desired flight path. Such signal transmitters are now in common use at large airports. The aircraft picks up the signals and determines how far from the center of the beam the aircraft is. The error signal is proportional to the distance the aircraft is from the center of the beam. The polarity of the error signal indicates which direction the aircraft is from the beam. Note, that the error signal on terminal 23 is only with regard to the lateral displacement of the aircraft from the center of the beam. The error signal on terminal 23 is passed through modulator 24 through the amplifier 25 and on to the limit #1 by way of adder circuit 26. Without any other signals into the adder circuit 26, the signal from amplifier 25 goes directly to limit #1. Limit #1 is set up to assure that the aircraft is not banked or rolled beyond the safe limits. Any error signal below the safe limits is passed to the adder circuit 22 and then onto the roll axis controllers by way of amplifier 27. It can be seen now, at this point of the description, the error signal is controlling the aircraft in the roll axis to slip the aircraft back onto the center of the beam. Again, it is to be noted, that other convention circuitry in the autopilot maintains the aircraft at the proper altitude and speed. Now consider the signal on terminal 20. This signal is from the roll attitude gyroscope and indicates the amount of movement about the roll axis of the aircraft. This signal, if within the selected range as described above, is allowed to pass through filter #1, the amplifier 21, and on to adder circuit 22. Any signal appearing in the adder circuit 22 from amplifier 21 is a bucking signal which limits the output of limit #1. Filter #1 allows the ILS error signals on terminal 23 to attempt to bank the airplane, but after a certain length of time has gone by, the signal from filter #1 is allowed to buck out or cancel a portion of the signal from limit #1. To visualize the effects of this circuit consider that the output of limit #1 is, for example, one volt, and is suddenly applied to the roll axis controllers which results in a bank angle of 3 degrees. Since filter #1, as described above, is a low pass filter, the signals from the roll attitude gyroscope on terminal 21 do not immediately appear in the adder circuit 22. However, after a time interval of perhaps one or two seconds, the signal on terminal 20 begins to appear to the extent that perhaps 9/10 of the bank angle is removed by the signal appearing in adder 22 from amplifier 21. The effect on the airplane is that the airplane banks over to the limiting bank angle of perhaps three degrees and then returns slowly to perhaps one degree and remains there until the output of limit #1 changes.

So far the aircraft was off the beam center. It was allowed to bank the maximum bank angle to return to center and then slowly brought back to something less than the maximum bank angle. It maintains this bank angle until it gets back on beam center, at which time the output of limit #1 changes. The high pass portion of filter #1 removes the attitude gyroscope signal on terminal 21 after a long period of time, perhaps, five or ten seconds, such that if the airplane is banked to its maximum and then returned to something less than maximum and still has not returned to the center of the beam, the filter #1 cancels the signal on terminal 20 and the airplane is again allowed to go to maximum bank angle. The reason for the filter #1 being a high and low pass filter is to reduce the control activities. It has been found in a computer study that the use of low pass and high pass filters, as described above, allows the use of a much longer time constant in rate circuit 28 and thereby effects a reduction in rate circuit "noise" which is in fact the cause of excessive control activity. By control activity is meant that the aircraft controls constantly move from one position to another in response to ILS error signals.

Next to be considered is the rate circuit 28 and its effect on the system. It has been found necessary to put in a means to anticipate the return of the aircraft to the beam center. This is the function of the rate circuit 28. If the return of the aircraft is not anticipated, then the controls will return to, for example, neutral only when the plane has reached beam center. However, this is too late since the aircraft has been coming into beam center and has lateral momentum, and, therefore, when the controls return to neutral the aircraft still has momentum which carries it beyond the center of the beam. The rate circuit 28 as described above, is effectively a differentiator having a long time constant, for example, of five seconds. The error signal from amplifier 25 is also passed to the rate circuit 28. The rate circuit 28 having a five second time constant in effect has a delayed action to cancel out a portion of the error signal from amplifier 25. The cancelling is done in adder circuit 26. Consequently, as the aircraft returns to beam center, the error signal from amplifier 25 diminishes continuously. However, the rate circuit output having a delayed action, does not diminish as fast as the error circuit and has the effect of cancelling the error signal in adder circuit 26. The effect of the rate circuit 28 is to cancel a larger and larger portion of the error signal as the error signal decreases in value which, in effect, is indicating that the aircarft is returning to beam center. Consequently, the error signal from amplifier 25 is effectively cancelled out completely just prior to the aircraft returning to the beam center. When the signal from the rate circuit 28 is larger than the error signal from amplifier 25, the resultant effect is to provide a signal of opposite phase to the roll axis controllers which operate the controls to level out the aircraft.

So far in this description, the aircraft is controlled by the error signal indicating its position off beam center and the signal from the roll attitude gyroscope is filtered so as to reduce the control activity by allowing a longer time constant in rate circuit 28, while the rate circuit 28 functions to anticipate the return of the aircraft to beam center and to level out the aircraft prior to returning to beam center, so that the momentum of the aircraft does not carry it past beam center.

The next item to be considered is the shaping circuit 30. As stated above, the shaping circuit 30 takes on the form of a standard dead zone circuit, i.e., allowing signals above a given magnitude to pass while not allowing signals below a given magnitude to pass. The input of the shaping circuit 30 is again the output of amplifier 25 which is the error signal. Should the error signal from amplifier 25 reach a given magnitude, it indicates that the aircraft is a considerable distance off the beam center and that merely by rolling the aircraft, it will not be sufficient to bring the aircraft back on to the beam center in the desired short time. Consequently, any error signal from the amplitude 25 which so indicates that the aircraft is a considerable distance from the beam center is large enough to let a portion of that signal to pass through the shaping circuit 30. That portion which passes through the shaping circuit 30 passes to the adder circuit 36, which, in turn, is connected by way of amplifier 42 to the yaw axis controllers. Consequently, if the aircraft is too far off the beam center to return merely by rolling the aircraft within the desired time, the excess error signal is allowed to pass to the yaw axis controllers which actually turn the aircraft into the beam center to hasten the aircraft to return to beam center. Once the error signal indicates that the roll of the aircraft will bring the aircraft back on to the beam center, the signal from amplifier 28 is not sufficient to pass through shaping circuit 30, and, therefore, the yaw axis controllers do not receive any signal from the shaping circuit 30, and the aircraft returns to runway heading.

The next item to be considered is the integrator 32. Basically, the integrator 32 functions to counteract a crosswind on the aircraft and any possible misalignment of the aircraft's compass system or inadvertent settings of the course select which will be considered later. Considering now the crosswind aspect of integrator 32, as stated above in the description of the integrator 32, the output of integrator 32 has a long time constant which provides an output which is maintained until the input into integrator 32 is changed. The integrator 32, in effect, is augmenting the error signal from amplifier 25. Therefore, it is to be added with the error signal from amplifier 25 in the adder circuit 26 and these two signals are opposed by the signal from the rate circuit 28. The error signal from amplifier 25 is fed through amplifier 29 to the integrator 32. A constant error signal causes an output to appear from integrator 32, which is the integral of the error signal. Synchro switch 33 maintains the integrator at null until the automatic approach is begun, at which time it opens to allow the integrator to function. Consequently, if the error signal from amplifier 25 is of sufficient duration to allow an output from integrator 32, without the limit #2 this signal from integrator 32 is fed to adder circuit 26 to be added with the error signal from amplifier 25 in a direction to further roll the aircraft. Note, again, that the limit #1 maintains the maximum limit that the aircraft may bank in spite of the signals from amplifier 25 and from integrator 32. Limit #2 has two outputs as described above. Signals below a given magnitude appear on line 34 and the remainder of any signals above a given magnitude appear on line 35. The signals on line 35 pass to the adder circuit 36 and on to the yaw axis controllers. If there is a crosswind, an error signal is required to compensate for the crosswind, hence the aircraft banks at a given angle and might maintain that angle off center from the beam for an indefinite time. However, the output from the integrator 32 after the time interval has passed, supplies an output to the adder circuit 26 by way of limit #2 which augments the error signal control to help bring the airplane back to the beam center. Without any crosswind the error signal from amplifier 25 is sufficient to bring the aircraft on to beam center and the signal from integrator 32 does not appear. Therefore, the effect of the integrator 32 is to compensate for the crosswind. Should the output from the integrator 32 be sufficiently large to allow a portion of the signal to pass on to line 35 to adder 36, this indicates again the aircraft is either far off the beam center or there is a large crosswind keeping the aircraft off the beam center. In either case, the signal on line 35 is passed to the yaw axis controllers to command the yaw axis controllers to turn the aircraft into the beam center because the roll axis controllers are unable to safely return the aircraft to beam center.

The next item to be discussed is the signal on terminal 37. This is the course select error signal. In most autopilots for aircraft there is a conventional direction gyroscope and a means for setting in a selected course heading so that any output from the directional gyroscope is an indication of the heading error of the aircraft. This course select error signal on terminal 37 is passed to adder circuit 36 and on to the yaw axis controllers. The signal then operates the yaw axis controllers to bring the aircraft on to the desired heading. The heading in case of an automatic landing is the heading of the runway. However, note that regardless of the signal on terminal 37, the excess signals from shaping circuit 30 and limit #2 is sufficient to over-ride the course select error signal to bring the aircraft back on the beam center. In other words, the aircraft may have the proper heading, but be displaced some distance to the left or right of the heading. It may be flying parallel to the beam center, in which case the aircraft is either rolled back on to the beam center or if it is too far off, it is turned by the signals from the shaping circuit 30 and the limit #2. Frequently, there is an error in the heading signal called the gimbaling error. This is an error which on certain headings causes the heading signal to change as a function of roll attitude. This error is destabilizing on some headings.

The subject of gimbaling errors has been covered thoroughly in the literature and need not be discussed here.

In order to hold a tight course, that is, flying down the center of the approach beam, without undue instability due to gimbaling error, it is necessary to have some means to augment the course select signal and this is the signal put in on terminal 40. It is a signal derived from the yaw rate gyroscope. The yaw rate signal passes to the yaw axis directly as it does in the normal operation with the exception that no washout circuits are employed whereas standard practice is to wash out the yaw rate gyroscope signal before it reaches the yaw axis. The object of the washout is to eliminate signals corresponding to stead turns while passing the high frequencies corresponding to random yawing motions. However, the washout is not required, since steady long-term turns are not probable, and overall stability is improved. The signal on terminal 40 is also sent to filter #2 and the output of the filter #2 is passed to the yaw axis by way of the adder 36. The filter #2 can have a time constant of, for example, two to three seconds. The filter #2 is essentially an electrical integrating circuit with a finite time constant. The time constant is selected to be long enough so that in effect the filter #2 is a memory circuit, so that if the aircraft is deviated from its heading by external influences, the output of the yaw rate gyroscope is integrated in the low pass filter circuit and serves as a memory to return the aircraft to the original heading. For proper operation, it is necessary that the time constant of the filter #2 be longer than the length of time required to get the aircraft back on the original heading. Since the filter #2 is an integrator, the output of the filter #2 is a heading displacement signal provided the time constant of the integrator circuit is long with respect to the time of the disturbance. So it can be seen that the filter #2 output is a heading signal which augments the heading signal from the course select.

The next item is the lateral acceleration signal appearing on terminal 38. If the aircraft slips to an extent which might damage the aircraft, the lateral acceleration signal appears on terminal 38. If the lateral acceleration is great enough, the signal on terminal 38 is high enough to pass a portion of it through the dead zone 39 and on to the adder circuit 36. The effect of the signal coming from dead zone 39 is to turn the yaw axis controllers in a direction to prevent lateral acceleration or slipping the aircraft, but to do this, the aircraft has to turn into the slip which also means that it is turning toward the beam center. So the lateral acceleration signal augments the yaw axis control signal to prevent damaging lateral accelerations and also have the side effect of getting the aircraft back on to the beam center faster, since a large amount of slip would indicate that the airplane is a considerable distance from the beam center.

The present invention provides a system which holds the aircraft on a tight heading, i.e., augmented signals are inserted into the yaw axis controllers to maintain the aircraft on a desired heading with greater accuracy than is normally required or used in normal flight of the aircraft. Furthermore, the present invention provides that the aircraft slip to correct for lateral displacements from the center of the beam path until such displacements reach a magnitude such that it is necessary to turn the aircraft about the yaw axis into the beam center. The use of the roll axis controls rather than the yaw axis controls for small displacements of the aircraft from the center of the beam path, maintains the aircraft heading proper although along the center of the beam path. By doing this, the aircraft does not have to straighten out prior to landing as is conventional with present day landing equipment. The reason it does not have to straighten out is that the aircraft is already in alignment with the runway all the way down the center of the beam path.

The present invention has been used with a standard autopilot and it was found that the aircraft held closely to the beam center and made corrections for errors by side-slipping the aircraft into the beam center while maintaining the heading of the aircraft in line with the heading of the runway, thereby greatly simplifying the landing of the aircraft.

Although this invention has been particularly described above, it is not intended that it should be limited by the above description, but only in accordance with the spirit and scope of the appended claims.

We claim:

1. Automatic landing approach control system for aircraft which is used in conjunction with a transmitting means located on a landing area for providing electrical signals along a desired path wherein the aircraft has means therein for emitting a first electrical signal in response to the lateral deviation of said aircraft from said desired path, course select means to detect deviation of said aircraft from a selected course and emit a second electrical signal in response to the deviation of said aircraft from said selected course and acceleration detection means to detect lateral accelerations of said aircraft and emit a third electrical signal in response to said lateral accelerations, comprising:

control means responsive to said first signal to control the movement of said aircraft about the roll axis of said aircraft in a direction to cause said aircraft to slip back towards said path, monitor means to monitor said first electrical signal and divert any excess signal over a predetermined magnitude, suppressing means to suppress said third electrical signal below a given magnitude, means to combine said excess signal, said second electrical signal and the output of said suppressing means to control said aircraft about the yaw axis, and compensating means responsive to said first electrical signal and having an output to said control means to compensate for any crosswind acting upon said aircraft so as to maintain said aircraft on said desired path.

2. The device as claimed in claim 1 wherein said compensating means is a long term integrator.

3. Automatic landing approach control system for aircraft which is used in conjunction with a transmitting means located on a landing area for providing electrical signals along a desired path wherein the aircraft has means therein for emitting a first electrical signal in response to the lateral deviation of said aircraft from said desired path, course select means to detect deviation of said aircraft from a selected course and emit a second electrical signal in response to the deviation of said aircraft from said selected course and acceleration detection means to detect lateral accelerations of said aircraft and emit a third electrical signal in response to said lateral accelerations, comprising:

control means responsive to said first signal to control the movement of said aircraft about the roll axis of said aircraft in a direction to cause said aircraft to slip back towards said path, monitor means to monitor said first electrical signal and divert any excess signal over a predetermined magnitude, suppressing means to suppress said third electrical signal below a given magnitude, means to combine said excess signal, said second electrical signal and the output of said suppressing means to control said aircraft about the yaw axis, and rate circuit means connected to receive said first electrical signal so as to sense the rate of return of said aircraft to said path, the output electrical signal from said rate circuit means being electrically connected to oppose said first electrical signal so as to return said aircraft to the neutral position about said roll axis prior to said aircraft reaching said path.

4. Automatic landing approach control system for aircraft which is used in conjunction with a transmitting means located on a landing area for providing electrical signals along a desired path wherein the aircraft has means therein for emitting a first electrical signal in response to the lateral deviation of said aircraft from said desired path, course select means to detect deviation of said aircraft from a selected course and emit a second electrical signal in response to the deviation of said aircraft from said selected course, acceleration detection means to detect lateral accelerations of said aircraft and emit a third electrical signal in response to said lateral accelerations and means emitting a fourth electrical signal in response to the angular movement of said aircraft about said roll axis, comprising:

control means responsive to said first signal to control the movement of said aircraft about the roll axis of said aircraft in a direction to cause said aircraft to slip back towards said path, monitor means to monitor said first electrical signal and divert any excess signal over a predetermined magnitude, suppressing means to suppress said third electrical signal below a given magnitude, means to combine said excess signal, said second electrical signal and the output of said suppressing means to control said aircraft about the yaw axis, and means to filter and add said fourth electrical signal to said portion of said first electrical signal above said given magnitude, said filter means passing only electrical signals within a predetermined frequency range.

5. Automatic landing approach control system for aircraft which is used in conjunction with a transmitting means located on a landing area for providing electrical signals along a desired path wherein the aircraft has means therein for emitting a first electrical signal in response to the lateral deviation of said aircraft from said desired path, course select means to detect deviation of said aircraft from a selected course and emit a second electrical signal in response to the deviation of said aircraft from said selected course and acceleration detection means to detect lateral accelerations of said aircraft and emit a third electrical signal in response to said lateral accelerations, comprising:

control means responsive to said first signal to control the movement of said aircraft about the roll axis of said aircraft in a direction to cause said aircraft to slip back towards said path, monitor means to monitor said first electrical signal and divert any excess signal over a predetermined magnitude, suppressing means to suppress said third electrical signal below a given magnitude, means to combine said excess signal, said second electrical signal and the output of said suppressing means to control said aircraft about the yaw axis, and means to augment said second electrical signal to reduce the deviation of said aircraft from said selected course.

6. Automatic landing approach control system for aircraft which is used in conjunction with a transmitting means located on a landing area for providing electrical signals along a desired path, comprising:

means in said aircraft for emitting a first electrical signal proportional in magnitude to the lateral deviation of said aircraft from said desired path, control means responsive to said first signal to control the movement of said aircraft about tht roll axis of said aircraft in a direction to cause said aircraft to slip back towards said path, monitor means to monitor said first electrical signal and divert any excess signal over a predetermined magnitude, course select means to detect deviation of said aircraft from a selected course and emit a second electrical signal proportional to the deviation of said aircraft from said selected course, acceleration detection means to detect lateral accelerations of said aircraft and emit a third electrical signal proportional in magnitude to said lateral accelerations, suppressing means to suppress said third electrical signal below a given magnitude, means to combine said excess signal, said second electrical signal and the output of said suppressing means to control said aircraft about the yaw axis, and compensating means responsive to said first electrical signal and having an output to said control means to compensate for any crosswind acting upon said aircraft so as to maintain said aircraft on said desired path.

7. The device as claimed in claim 6 wherein said monitor means comprises:

a shaping circuit, said first signal being the input to said shaping circuit, said shaping circuit comprising;

a double zener diode connected in series with the input and output of said shaping circuit such that signals below a said predetermined magnitude do not pass through said shaping circuit while signals above said predetermined magnitude do pass through said shaping circuit, and constitute said excess signal.

8. A device as claimed in claim 6 wherein said suppressing means comprises:

a double zener diode connected in series with the input and output of said suppressing means such that when said third electrical signal is below a given magnitude said double zener diode restricts the passage of said third electrical signal and when said third electrical signal is above a given magnitude said double zener diode allows that portion of said third electrical signal above said given magnitude to pass through said suppressing means.

9. The device as claimed in claim 6 wherein said compensating means is a long term integrator.

10. A device as claimed in claim 6 wherein said compensating means is an integrator comprising:

a motor, integrating gears, and a synchro, the input to said gears being mechanically connected to the output of said motor, the input to said integrator being the control signal to said motor, the output of said integrating gears being mechanically connected to the rotor of said synchro and the stator of said synchro being the output of said integrator such that said incoming signal to said integrator drives said motor and said gears to position said rotor such that the output on said stator is a long time integral of the input to said integrator.

11. A device as claimed in claim 10 wherein said integrator further comprises:

a generator mechanically connected to the output of said motor to provide a feedback electrical signal to said motor.

12. Automatic landing approach control system for aircraft which is used in conjunction with a transmitting means located on a landing area for providing electrical signals along a desired path, comprising:

means in said aircraft for emitting a first electrical signal proportional in magnitude to the lateral deviation of said aircraft from said desired path, control means responsive to said first signal to control the movement of said aircraft about the roll axis of said aircraft in a direction to cause said aircraft to slip back towards said path, monitor means to monitor said first electrical signal and divert any excess signal over a predetermined magnitude, course select means to detect deviation of said aircraft from a selected course and emit a second electrical signal proportional to the deviaton of said aircraft from said selected course, acceleration detection means to detect lateral accelerations of said aircraft and emit a third electrical signal proportional in magnitude to said lateral accelerations, suppressing means to suppress said third electrical signal below a given magnitude, means to combine said excess signal, said second electrical signal and the output of said suppressing means to control said aircraft about the yaw axis, and rate circuit means connected to receive said first electrical signal so as to sense the rate of return of said aircraft to said path, the output electrical signal from said rate circuit means being electrically connected to oppose said first electrical signal so as to return said aircraft to the neutral position about said roll axis prior to said aircraft reaching said path.

13. The device as claimed in claim 12 wherein said monitor means comprises:
a shaping circuit, said first signal being the input to said shaping circuit,
said shaping circuit comprising;
a double zener diode connected in series with the input and output of said shaping circuit such that signals below a said predetermined magnitude do not pass through said shaping circuit while signals above said predetermined magnitude do pass through said shaping circuit, and constitute said excess signal.

14. A device as claimed in claim 12 wherein said suppressing means comprises:
a double zener diode connected in series with the input and output of said suppressing means such that when said third electrical signal is below a given magnitude said double zener diode restricts the passage of said third electrical signal and when said third electrical signal is above a given magnitude said double zener diode allows that portion of said third electrical signal above said given magnitude to pass through said suppressing means.

15. The device as claimed in claim 12 wherein said rate circuit means comprises electrical means to differentiate said incoming signal.

16. The device as claimed in claim 12 wherein said rate circuit means comprises:
a demodulator,
a modulator,
a capacitor connected in series between said modulator and said demodulator, and
a resistor,
said capacitor also being connected to ground on the modulator side of said capacitor by way of said resistor, said capacitor and resistor functioning to differentiate the output of said demodulator.

17. Automatic landing approach control system for aircraft which is used in conjunction with a transmitting means located on a landing area for providing electrical signals along a desired path, comprising:
means in said aircraft for emitting a first electrical signal proportional in magnitude to the lateral deviation of said aircraft from said desired path,
control means responsive to said first signal to control the movement of said aircraft about the roll axis of said aircraft in a direction to cause said aircraft to slip back towards said path,
monitor means to monitor said first electrical signal and divert any excess signal over a predetermined magnitude,
course select means to detect deviation of said aircraft from a selected course and emit a second electrical signal proportional to the deviation of said aircraft from said selected course,
acceleration detection means to detect lateral accelerations of said aircraft and emit a third electrical signal proportional in magnitude to said lateral accelerations,
suppressing means to suppress said third electrical signal below a given magnitude,
means to combine said excess signal, said second electrical signal and the output of said suppressing means to control said aircraft about the yaw axis, and
means emitting a fourth electrical signal proportional in magnitude to the angular movement of said aircraft about said roll axis, and means to filter and add said fourth electrical signal to said portion of said first electrical signal above said given magnitude, said filter means passing only electrical signals within a predetermined frequency range.

18. A device as claimed in claim 17 wherein said monitor means comprises:
a shaping circuit, said first signal being the input to said shaping circuit,
said shaping circuit comprising:
a double zener diode connected in series with the input and output of said shaping circuit such that signals below a said predetermined magnitude do not pass through said shaping circuit while signals above said predetermined magnitude do pass through said shaping circuit, and constitute said excess signal.

19. A device as claimed in claim 17 wherein said suppressing means comprises:
a double zener diode connected in series with the input and output of said suppressing means such that when said third electrical signal is below a given magnitude said double zener diode restricts the passage of said third electrical signal and when said third electrical signal is above a given magnitude said double zener diode allows that portion of said third electrical signal above said given magnitude to pass through said suppressing means.

20. The device as claimed in claim 17 wherein said means emitting a third electrical signal is a roll attitude gyroscope, and wherein said filter is a high and low pass filter.

21. The device as claimed in claim 17 wherein said filter means comprises a demodulator connected to the input of said filter means,
a low pass filter connected to the output of said demodulator,
a high pass filter connected to the output of said low pass filter, and
a modulator connected to the output of said high pass filter, the output of the said modulator being the output of said filter means.

22. Automatic landing approach control system for aircraft which is used in conjunction with a transmitting means located on a landing area for providing electrical signals along a desired path, comprising:
means in said aircraft for emitting a first electrical signal proportional in magnitude to the lateral deviation of said aircraft from said desired path,
control means responsive to said first signal to control the movement of said aircraft about the roll axis of said aircraft in a direction to cause said aircraft to slip back towards said path,
monitor means to monitor said first electrical signal and divert any excess signal over a predetermined magnitude,
course select means to detect deviation of said aircraft from a selected course and emit a second electrical signal proportional to the deviation of said aircraft from said selected course,
acceleration detection means to detect lateral accelerations of said aircraft and emit a third electrical signal proportional in magnitude to said lateral accelerations.
suppressing means to suppress said third electrical signal below a given magnitude,
means to combine said excess signal, said second electrical signal and the output of said suppressing means to control said aircraft about the yaw axis, and
means to augment said second electrical signal to reduce the deviation of said aircraft from said selected course.

23. The device as claimed in claim 22 wherein said monitor means comprises:
a shaping circuit, said first signal being the input to said shaping circuit, said shaping circuit comprising:
a double zener diode connected in series with the input and output of said shaping circuit such that signals below a said predetermined magnitude do not pass through said shaping circuit while signals above said predetermined magnitude do pass through said shaping circuit, and constitute said excess signal.

24. The device as claimed in claim 22 wherein said suppressing means comprises:
a double zener diode connected in series with the input and output of said suppressing means such that when said third electrical signal is below a given magnitude said double zener diode restricts the passage of said third electrical signal and when said third electrical signal is above a given magnitude said double zener diode allows that portion of said third electrical signal above said given magnitude to pass through said suppressing means.

25. The device as claimed in claim 22 wherein said means to augment said second electrical signal comprises:
means to provide a yaw rate signal,
means to add said yaw rate signal to said second electrical signal, and
means to provide a fourth electrical signal to add to said second and third electrical signals, said fourth electrical signal being the integral of said yaw rate signal.

26. Automatic landing approach control system for aircraft which is used in conjunction with a transmitting means located on a landing area for providing electrical signals along a desired path, comprising:
means in said aircraft for emitting a first electrical signal proportional in magnitude to the lateral deviation of said aircraft from said desired path,
control means responsive to said first signal to control the movement of said aircraft about the roll axis of said aircraft in a direction to cause said aircraft to slip back towards said path,
monitor means to monitor said first electrical signal and divert any excess signal over a predetermined magnitude,
course select means to detect deviation of said aircraft from a selected course and emit a second electrical signal proportional to the deviation of said aircraft from said selected course,
acceleration detection means to detect lateral accelerations of said aircraft and emit a third electrical signal proportional in magnitude to said lateral accelerations,
suppressing means to suppress said third electrical signal below a given magnitude,
means to combine said excess signal, said second electrical signal and the output of said suppressing means to control said aircraft about the yaw axis, and
compensating means responsive to said first electrical signal and having an output to said control means to compensate for any crosswind acting upon said aircraft so as to maintain said aircraft on said desired path,
rate circuit means connected to receive said first electrical signal so as to sense the rate of return of said aircraft to said path, the output electrical signal from said rate circuit means being electrically connected to oppose said first electrical signal so as to return said aircraft to the neutral position about said roll axis prior to said aircraft reaching said path,
means emitting a fourth electrical signal proportional in magnitude to the angular movement of said aircraft about said roll axis,
means to filter and add said fourth electrical signal to said portion of said first electrical signal above said given magnitude, said filter means passing only electrical signals within a predetermined frequency range; and
means to augment said second electrical signal to reduce the deviation of said aircraft from said selected course.

27. Automatic landing approach control for aircraft comprising:
an aircraft means situated on a runway for transmitting an electrical signal through the atmosphere along a desired path,
means in said aircraft for emitting a first electrical signal proportional in magnitude to the lateral deviation of said aircraft from said desired path,
control means responsive to said first signal to control the movement of said aircraft about the roll axis of said aircraft in a direction to cause said aircraft to slip back towards said path,
monitor means to monitor said first electrical signal and divert any excess signal over a predetermined magnitude,
course select means to detect deviation of said aircraft from a selected course and emit a second electrical signal proportional to the deviation of said aircraft from said selected course,
acceleration detection means to detect lateral accelerations of said aircraft and emit a third electrical signal proportional in magnitude to said lateral accelerations,
suppressing means to suppress said third electrical signal below a given magnitude,
means to combine said excess signal, said second electrical signal and the output of said suppressing means to control said aircraft about the yaw axis, and
compensating means responsive to said first electrical signal and having an output to said control means to compensate for any crosswind acting upon said aircraft so as to maintain said aircraft on said desired path,
rate circuit means connected to receive said first electrical signal so as to sense the rate of return of said aircraft to said path, the output electrical signal from said rate circuit means being electrically connected to oppose said first electrical signal so as to return said aircraft to the neutral position about said roll axis prior to said aircraft reaching said path,
means emitting a fourth electrical signal proportional in magnitude to the angular movement of said aircraft about said roll axis,
means to filter and add said fourth electrical signal proportional in magnitude to the angular movement of said aircraft about said roll axis,
means to filter and add said fourth electrical signal to said portion of said first electrical signal above said given magnitude, said filter means passing only electrical signals within a predetermined frequency range; and
means to augment said second electrical signal to reduce the deviation of said aircraft from said selected course.

References Cited in the file of this patent
UNITED STATES PATENTS

| | | |
|---|---|---|
| 2,987,276 | Osder | June 6, 1961 |
| 2,999,200 | Esval | Sept. 5, 1961 |